(12) United States Patent
Dunkel et al.

(10) Patent No.: US 11,872,935 B2
(45) Date of Patent: Jan. 16, 2024

(54) ILLUMINATION APPARATUS FOR THE INTERIOR OF A MOTOR VEHICLE

(71) Applicant: Bayerische Motoren Werke Aktiengesellschaft, Munich (DE)

(72) Inventors: Klara Dunkel, Weyarn (DE); Thomas Moseler, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/034,938

(22) PCT Filed: Jan. 28, 2022

(86) PCT No.: PCT/EP2022/052132
§ 371 (c)(1),
(2) Date: May 2, 2023

(87) PCT Pub. No.: WO2022/167347
PCT Pub. Date: Aug. 11, 2022

(65) Prior Publication Data
US 2023/0398930 A1    Dec. 14, 2023

(30) Foreign Application Priority Data
Feb. 4, 2021 (DE) ...................... 10 2021 102 567.2

(51) Int. Cl.
*B60Q 3/74* (2017.01)
*B60Q 3/217* (2017.01)
(Continued)

(52) U.S. Cl.
CPC ............... *B60Q 3/74* (2017.02); *B60Q 3/217* (2017.02); *B60Q 3/64* (2017.02); *B60Q 3/78* (2017.02)

(58) Field of Classification Search
CPC ...................... B60Q 3/60–66; B60Q 3/74–745
See application file for complete search history.

(56) References Cited

U.S. PATENT DOCUMENTS

| 7,534,017 | B2 | 5/2009 | Barowski et al. |
| 9,423,101 | B2 | 8/2016 | Holten et al. |
| (Continued) | | | |

FOREIGN PATENT DOCUMENTS

| CN | 107399269 A | 11/2017 |
| DE | 295 09 610 U1 | 8/1995 |
| (Continued) | | |

OTHER PUBLICATIONS

International Search Report (PCT/ISA/210) issued in PCT Application No. PCT/EP2022/052132 dated Jul. 22, 2022 with English translation (six (6) pages).

(Continued)

*Primary Examiner* — Jason M Han
(74) *Attorney, Agent, or Firm* — Crowell & Moring LLP

(57) ABSTRACT

An illumination apparatus for the interior of a motor vehicle includes a housing on which a light-transmissive cover is provided, and an illuminant configured to produce light in the interior of the housing, the light emerging from the illumination apparatus through the cover to illuminate the interior. The cover includes a faceted outer surface made of a plurality of plane facets. Further, the illuminant includes one or more flat lighting elements in the interior of the housing, each flat lighting element having two extensive opposing side surfaces and an edge situated between the side surfaces, the illuminant being configured such that light is emitted through both side surfaces of a respective flat lighting element during operation, with the light emerging from the illumination apparatus through the cover.

20 Claims, 4 Drawing Sheets

(51) Int. Cl.
*B60Q 3/78* (2017.01)
*B60Q 3/64* (2017.01)

(56) References Cited

U.S. PATENT DOCUMENTS

| | | |
|---|---|---|
| 9,738,219 B1 | 8/2017 | Salter et al. |
| 9,839,098 B2 * | 12/2017 | Salter ................ B60Q 3/82 |
| 2011/0228231 A1 | 9/2011 | Schreiber et al. |
| 2014/0146290 A1 | 5/2014 | Sieler et al. |
| 2019/0241121 A1 | 8/2019 | Golgiri et al. |

FOREIGN PATENT DOCUMENTS

| | | |
|---|---|---|
| DE | 10 2009 024 894 A1 | 12/2010 |
| DE | 10 2011 076 083 A1 | 11/2012 |
| EP | 3 318 446 A1 | 5/2018 |
| EP | 3 450 823 A1 | 3/2019 |
| JP | 2005-347144 A | 12/2005 |

OTHER PUBLICATIONS

German-language Written Opinion (PCT/ISA/237) issued in PCT Application No. PCT/EP2022/052132 dated Jul. 22, 2022 (five (5) pages).
German-language Search Report issued in German Application No. 10 2021 102 567.2 dated Sep. 22, 2021 with partial English translation (12 pages).

* cited by examiner

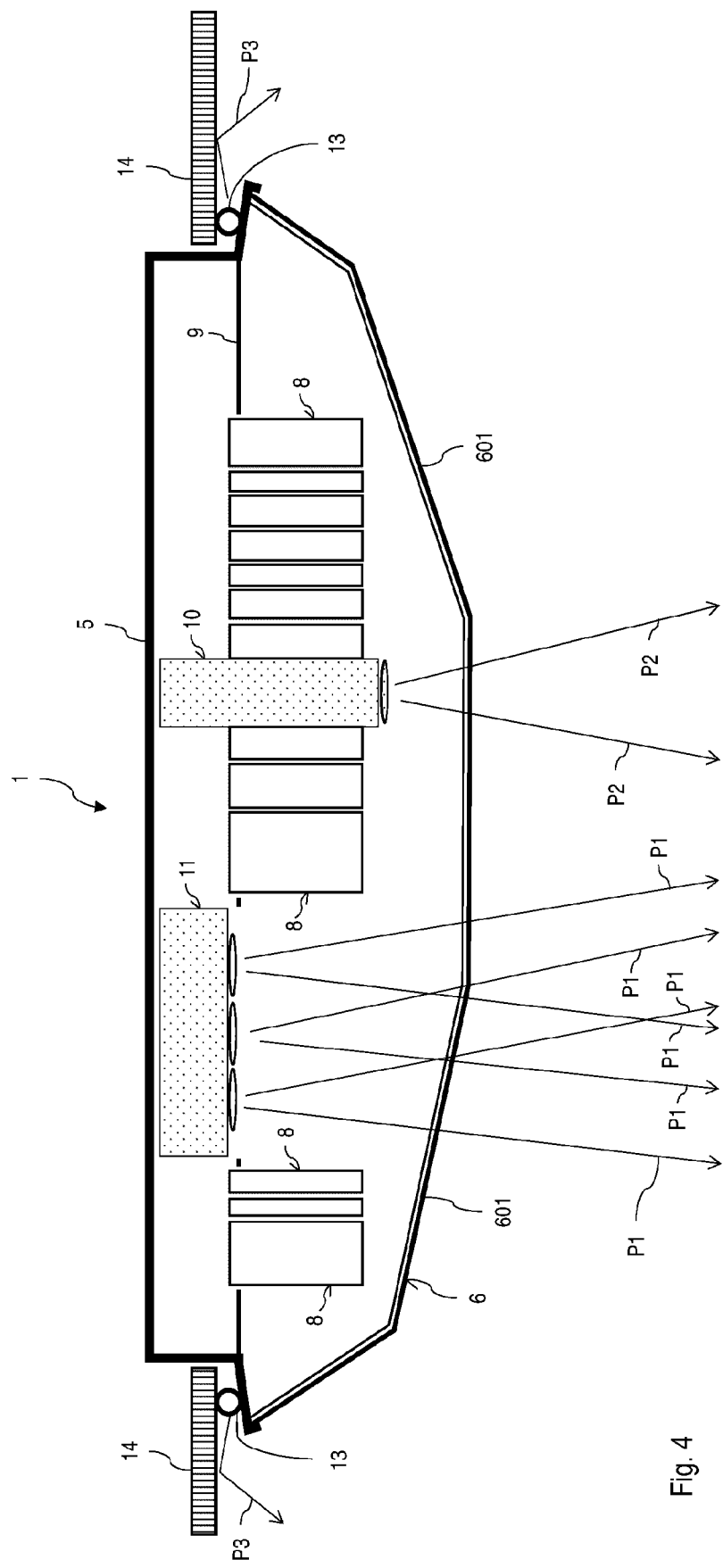

ILLUMINATION APPARATUS FOR THE INTERIOR OF A MOTOR VEHICLE

BACKGROUND AND SUMMARY OF THE INVENTION

The invention relates to a lighting device for the interior of a motor vehicle and to a corresponding motor vehicle.

The prior art has disclosed many different variants of interior lighting for motor vehicles. In addition to luminaires in the roof liner, which illuminate a region in the passenger compartment and optionally also comprise reading lamps, there are ambient interior luminaires, for example in the form of light guides, which are installed in the interior trim of the motor vehicle. Ambient interior luminaires generate indirect light and create a pleasant atmosphere in the interior for the vehicle occupants.

It is an object of the invention to develop a lighting device for the interior of a motor vehicle, which generates ambient interior light on the basis of a novel constructional setup.

This object is achieved by the lighting device according to the claimed invention.

The lighting device according to embodiments of the invention is provided for the interior (i.e., the passenger compartment) of a motor vehicle, the motor vehicle preferably being an automobile but optionally also being able to be a truck. To the extent that interactions between the lighting device and components of the motor vehicle or the interior thereof are described below, and in particular in the patent claims, this should always be understood to the effect of the interaction occurring when the lighting device is arranged or installed in the interior of the motor vehicle.

The lighting device according to embodiments of the invention comprises a housing, on which a light-transmissive cover plate, which is preferably made of plastic, is provided. That is to say the cover plate has a transmittance of greater than zero for visible light. Depending on the configuration, the transmittance of the cover plate can be chosen differently; the transmittance is preferably greater than 50%. The cover plate may optionally also be transparent, that is to say have a transmittance of substantially 100%.

The lighting device according to embodiments of the invention contains an illuminant configured to produce light in the interior of the housing, the light emerging from the lighting device through the cover plate for the purpose of illuminating the interior. According to embodiments of the invention, the cover plate has a faceted outer surface, that is to say its outer surface has a plurality of plane facets. The illuminant of the lighting device comprises one or more planar luminous elements in the interior of the housing, with a respective planar luminous element having two opposing side faces with a planar extent and an edge situated between the side faces. In this case, the illuminant is designed such that, during its operation, light is emitted via both side faces of a respective planar luminous element and emerges from the lighting device or its housing via the cover plate.

The lighting device according to embodiments of the invention creates a very pleasant ambient illumination by way of a number of planar luminous elements which emit light via a cover plate with a faceted outer surface. The faceted outer surface results in an appealing, very memorable shape of the lighting device in the style of a diamond, to be precise both in its cold appearance (i.e., when the lighting device is switched off) and in its warm appearance (i.e., when the lighting device is switched on).

In a preferred embodiment of the lighting device according to the invention, the illuminant is designed such that, during its operation, light is further at least sectionally emitted via the edge of a respective planar luminous element and emerges from the lighting device via the cover plate. This allows the effect of a comprehensively luminous body to be conveyed very well for the individual luminous elements.

In a preferred embodiment, the illuminant of the lighting device according to the invention comprises a number of light sources (preferably one or more LEDs, for example single color LEDs and/or white light LEDs and/or RGB LEDs and/or RGBW LEDs) and, as one or more planar luminous elements, at least in part, one or more flat light guides. In other words, at least some of the planar luminous elements and optionally even all of the planar luminous elements are in the form of respective flat light guides. The flat light guides are preferably made of a plastic. The flat light guide or guides are arranged such that, in a respective flat light guide, light originating from the number of light sources and entering into an input coupling portion of its edge is guided along the opposite side faces and is at least partially emitted via the side faces in the process in order to emerge from the lighting device via the cover plate. Preferably, some of the light guided along the opposite side faces is also emitted via an output coupling portion of the edge in the process in order to likewise emerge from the lighting device via the cover plate. Corresponding planar luminous elements can easily be realized by way of light sources and flat light guides using this embodiment.

In a preferred variant of the embodiment above, one or more light sources of the number of light sources radiate light directly into the input coupling portion of one or more flat light guides. Alternatively or additionally, it is also possible for one or more light sources of the number of light sources to be arranged such that light originating from these is reflected and/or scattered prior to the entrance into the input coupling portion of one or more flat light guides, as a result of which indirect light radiation is achieved. Consequently, a flexible light feed into the flat light guide or guides can be obtained.

In a further embodiment of the lighting device according to the invention, one or more self-luminous OLED elements can optionally also be used as planar luminous elements instead of, or in addition to, the above-described flat light guides (OLED=organic light-emitting diode). A person skilled in the art is aware of such OLED elements. Separate light sources are not required if these OLED elements are used, since light sources are integrated in the respective OLED elements.

In a further preferred embodiment, the illuminant of the lighting device is designed in such a way that the color of the light emission can be varied for at least some of the planar luminous elements. As a result, the color of the ambient illumination can be changed. For the above-described embodiment with flat light guides and associated light sources, this can be achieved by virtue of using RGB LEDs or RGBW LEDs, the emitted light color of which can be changed.

In a further preferred configuration, at least some of the planar luminous elements are designed to be slab-shaped with plane side faces. Preferably, the side faces of all slab-shaped luminous elements run substantially parallel to one another, that is to say it is not only the side faces of an individual luminous element but also the side faces of different luminous elements that are parallel to one another. A particularly pleasant ambient illumination is obtained as a result. The slab-shaped luminous elements are preferably in the form of rectangles. In the case where a slab-shaped luminous element is a rectangular flat light guide, one edge of the rectangle preferably represents the above-described input coupling portion, whereas the above-defined output coupling portion is preferably represented by at least one other edge and optionally also by all other edges of the rectangle.

In a preferred variant of the just-described embodiment and in a plan view of the cover plate, the side faces of all slab-shaped luminous elements extend substantially perpendicular to the plane of the plan view (i.e., in the direction of view on the plan view). A compact structure of the lighting device with a plurality of luminous elements integrated therein can be obtained in this way.

As already indicated above, the cover plate may have different transmittances or optical properties. In particular, the cover plate can be least sectionally translucent (i.e., partially light-transmissive) and/or at least sectionally transparent and/or at least sectionally light-scattering and/or at least sectionally colored. In this case, different portions of the cover plate may optionally have different optical properties.

In a further preferred embodiment, a projection apparatus for projecting a light distribution into the interior of the motor vehicle is installed in the housing of the lighting device in addition to the illuminant. In this context, projection apparatuses known per se, which are able to produce static and optionally also dynamic (i.e., time-varying) projections, can be used. In one variant, the projection apparatus comprises a DMD apparatus (DMD=digital mirror device) known per se, that is to say the projection device contains what is known as a DLP projector (DLP=digital light processing). Alternatively or additionally, the projection device may also comprise a multi-aperture projection unit and/or a roller with reflective and nonreflective portions, which roller rotates during operation and is illuminated by a luminous unit of the projection apparatus in the process, with the illuminated region of the roller being projected into the interior of the motor vehicle by way of an optical unit of the projection apparatus. By way of example, a microlens array known per se can be used as multi-aperture projection unit. Preferably, the projection display described in documents DE 10 2009 024 894 A1 and DE 10 2011 076 083 A1 is used as multi-aperture projection unit.

In a further variant of the lighting device according to the invention, one or more luminaires are installed in the housing in addition to the illuminant, the luminaires each being provided to illuminate a delimited passenger region. In this way, a reading light function can also be integrated in the lighting device.

In a further embodiment, the lighting device comprises a further illuminant, preferably a light guide and/or an LED band, for indirect illumination of the interior of the motor vehicle. This illuminant is preferably positioned in such a way that it is not directly visible to the occupants in the installed state of the lighting device.

In a further embodiment, the lighting device is designed to be installed in a trim of the interior of the motor vehicle, preferably at a position above the door panel of the motor vehicle and particularly preferably in the roof liner of the motor vehicle. In other words, the lighting device is intended to be provided for installation in the trim of the interior of the motor vehicle, that is to say the constructional setup of the lighting device allows installation in the corresponding interior trim.

In addition to the above-described lighting device, the invention also relates to a motor vehicle comprising the lighting device according to embodiments of the invention. Optionally, a plurality of such lighting devices may be installed in the motor vehicle in the process.

In this case, the lighting device is preferably installed in a trim of the interior of the motor vehicle, in particular at a position above the door panel and particularly preferably in the roof liner of the motor vehicle.

An exemplary embodiment of the invention is described in detail below on the basis of the attached figures.

BRIEF DESCRIPTION OF THE DRAWINGS

FIG. 4 shows a very schematic longitudinal section through the lighting device of FIG. 2.

DETAILED DESCRIPTION OF THE DRAWINGS

Figure 1:
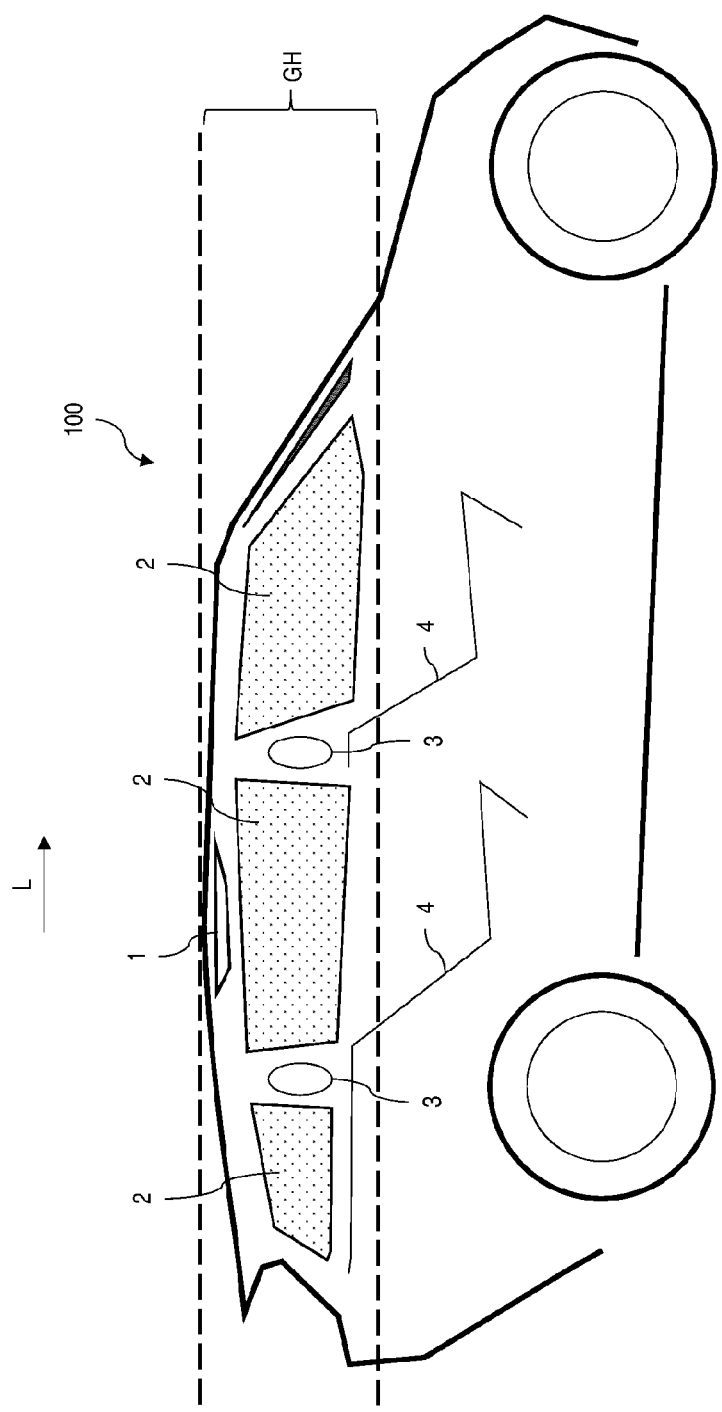
FIG. 1 shows a very schematic illustration of a motor vehicle, in which an embodiment of the lighting device according to the invention is installed in the roof liner.

A variant of a lighting device according to the invention, which is installed as an interior luminaire in the roof liner of a motor vehicle, is described below. In a very schematic illustration, FIG. 1 shows a corresponding motor vehicle 100, the longitudinal direction of which is indicated by the arrow L. In a manner known per se, this motor vehicle comprises side panes 2 and schematically indicated occupant seats 4 with corresponding headrests 3. A variant of the lighting device according to the invention, which is denoted by reference sign 1, is installed in the roof liner of the motor vehicle 100. This is only one possible installation position in the interior of the motor vehicle. Optionally, the lighting device may also be installed at other locations in the interior. The installation position of the lighting device is preferably located in a region above the door panel of the motor vehicle 100. This region is indicated using reference sign GH in FIG. 1 and is usually also referred to as greenhouse.

Figure 2:
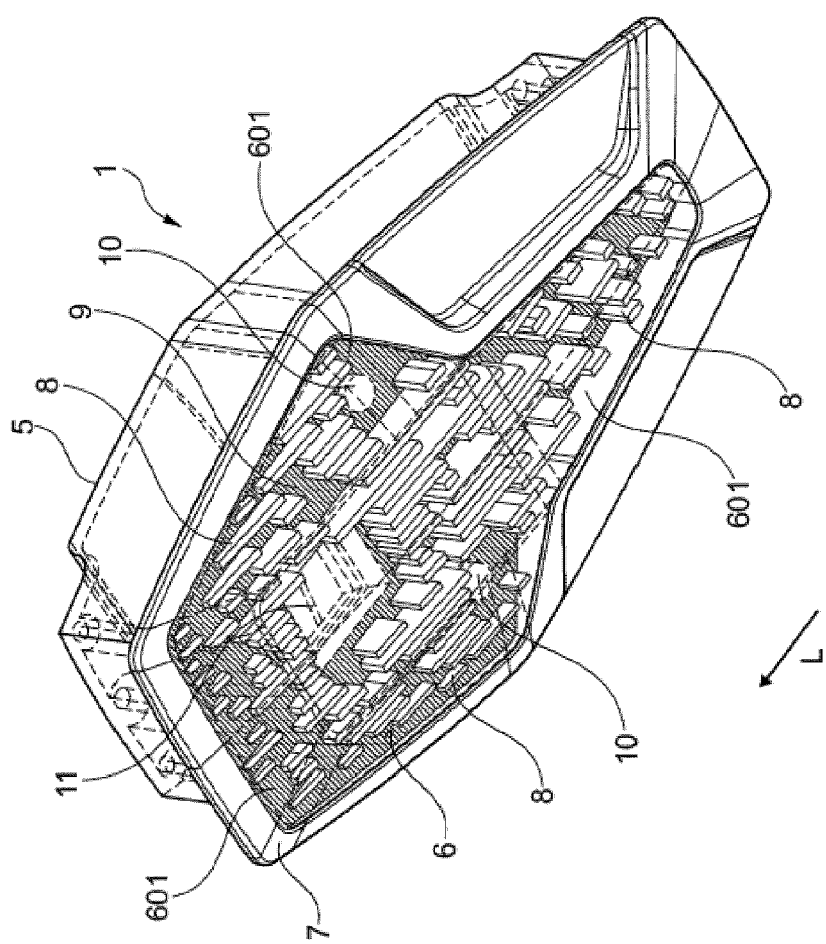
FIG. 2 shows a perspective detailed illustration of the lighting device installed in FIG. 1.

FIG. 2 shows a perspective detailed view of the lighting device 1 of FIG. 1.

The lighting device comprises a housing 5, which has been mounted to the roof liner using suitable attachment devices (not shown). A translucent (i.e., partially light-transmissive), faceted cover plate 6 made of plastic is located on the front side of the housing 5. That is to say, the outer surface of the cover plate comprises a plurality of plane facets 601, which adjoin one another and are aligned in a plurality of different planes. For reasons of clarity, only some of the facets have been denoted by reference sign 601. The pleasant impression of a sculptural element is produced by the faceted cover plate 6, resulting in an iconic accentuation of the vehicle interior. Further, situated on the outer surface of the cover plate 6, there is a frame or an outer screen 7, which frames the cover plate and highlights the sculptural appearance of the lighting device by appropriate shaping.

As is apparent from FIG. 2, the interior of the lighting device 1 contains an array of a plurality of slot-shaped luminous elements 8 in the form of rectangular flat light guides of various sizes, which extend in parallel in various planes that run in the longitudinal direction L the motor vehicle. The individual flat light guides consist of transparent plastic and are fed by a light source (not visible in FIG. 2), causing the illumination of the flat light guides as explained in more detail below. In this case, the slab-shaped flat light guides extend through an inner screen 9, on the back side of which the corresponding light source is situated. In addition to the flat light guides 8, the lighting device of FIG. 1 contains two luminous units 10, which serve as reading lights for the passengers in the back seats. One of the reading lamps illuminates a delimited region for the left seated position in the back seats, while the other reading lamp illuminates a delimited region for the right seated position in the back seats.

Moreover, the lighting device 1 contains a projection module 11, which in the embodiment described here is a multi-aperture projection unit in the form of a microlens array serving to project an additional light distribution, for example a logo, into the interior of the motor vehicle when required or in a manner coupled also to specific events. By way of example, the projection of this light distribution can be triggered by the opening of the back doors. A different projection unit may also be installed in the lighting device 1 in place of a microlens array, for example a projection unit for projecting dynamically changeable images; for example, this can be achieved by way of a DLP projector. In this way, it is possible to generate different projections or optionally also time-varying projections and pleasant light effects as a result.

Figure 3:
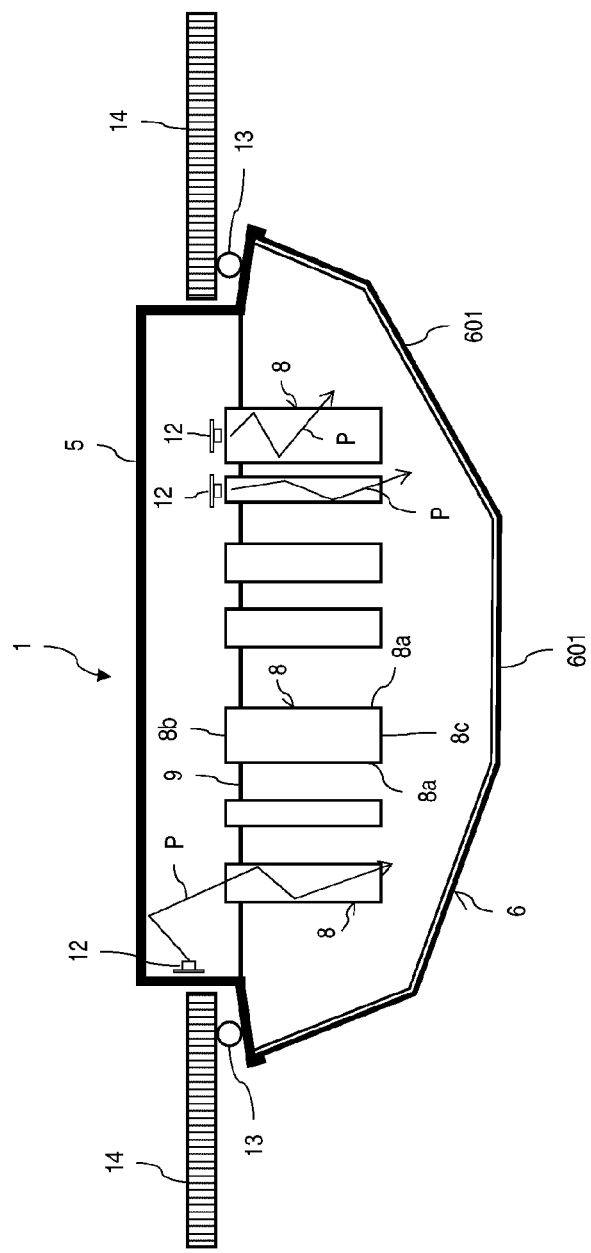
FIG. 3 shows a very schematic cross section through the lighting device of FIG. 2.

FIG. 3 shows a very simplified schematic sectional view of the lighting device of FIG. 2 in a vertical plane that runs transversely to the longitudinal direction L of the motor vehicle and is located offset from the projection module 11. On account of the significant simplification of the sectional view in FIG. 3 and also the further sectional view of FIG. 4, the number, dimensions and shapes of the components do not correspond to those in the view of FIG. 2. Moreover, FIG. 3 and FIG. 4 do not reproduce the outer screen 7 visible in FIG. 2 either.

As is evident from FIG. 3, the housing 5 is installed in a hole in the roof liner 14 of the motor vehicle. A light source 12 in the form of an RGBW LED, which can generate different colors by way of appropriate control, is situated in the left-hand upper region of the housing behind the inner screen 9. In this case, the inside of the housing 5 has a white color in order thereby to achieve good reflection or scattering of the light from this light source. The left-hand light source 12 brings about an indirect light feed to the flat light guides 8 depicted in section. That is to say, light originating from the light source is reflected or scattered at the housing interior and then enters the individual flat light guides 8. In a modified embodiment, a separate light source 12 which directly feeds light into the corresponding flat light guide can also be used for each flat light guide 8. This is indicated in exemplary fashion in FIG. 3 for two flat light guides located to the right, which are fed separately with light by way of a respective light source 12.

A respective flat light guide 8 comprises two side faces 8a running in parallel, and a quadrilateral edge, of which an upper rim or an upper edge portion 8b and a lower rim or a lower edge portion 8c are evident from FIG. 1. For reasons of clarity, the reference signs 8a, 8b, and 8c are only specified for one of the flat light guides 8 shown in FIG. 3. The upper edge portion 8b forms an input coupling portion serving to input couple reflected or scattered light from the housing interior, or alternatively to input couple light directly from a light source arranged at the edge portion 8b, into the corresponding flat light guide. Corresponding ray paths of light are indicated in exemplary fashion in FIG. 3 by way of arrows P.

The light entering the individual flat light guides via the edge portion 8b is partially reflected at the side faces 8a of the flat light guides and partially emerges via the side faces 8a. As a consequence, a portion of the radiated-in light leaves the flat light guide via the side faces 8a while another portion of the radiated-in light leaves the flat light guide via the lower edge portion 8b and the lateral edges that run between the edge portions 8b and 8c, with the result that the lower edge portion and the edges form an output coupling portion of the flat light guide. This has the effect that the individual flat light guides 8 shine over their entire area during the operation of the corresponding light sources 12. These luminous flat light guides are visible to the vehicle occupants via the faceted translucent cover plate 6. The shining flat light guides create a very pleasant ambient interior illumination in the region of the roof liner 14.

In the embodiment described here, a circumferential light guide 13 with a round cross section is additionally installed in the edge of the housing 5, the circumferential light guide being positioned in an undercut between the housing 5 and the roof liner 14 and being evident in section from FIG. 3 and FIG. 4. This yields an additional ambient luminous effect as a result of the light from the light guide 13 scattering on the roof liner 14.

FIG. 4 shows, once again, a very simplified sectional view in a vertical plane that runs in the longitudinal direction L of the motor vehicle and runs substantially centrally through the projection module 11. Additionally, FIG. 4 reproduces one of the reading lamps 2 shown in FIG. 2, which reading lamp is situated outside of and offset to the sectional plane of FIG. 4. As already mentioned above, the lighting device 1 comprises, in addition to the flat light guides 8, the projection module 11, which is a microlens array in accordance with FIG. 4. Corresponding light rays of the array are reproduced by arrows P1 in exemplary fashion. A suitable image can be projected into the interior of the motor vehicle, for example in the region of the back seats, by way of the projection module 11. Additionally, two reading lamps 10 are installed in the interior of the lighting device, one of which is schematically reproduced in FIG. 4. By way of example, light rays emanating from this reading lamp are indicated by the arrows P2.

In a modified embodiment, the projection module 11 may also comprise a rotatable roller with reflective and light-absorbing portions. This roller is illuminated by way of a light source of the projection module. Further, a projection optical unit for projecting the illuminated region of the roller into the interior of the motor vehicle is provided in the projection module. The reading lamps 10 and the projection module 11 are optional components of the lighting device and may optionally also be dispensed with.

FIG. 4 shows, once again, the light guide 13, which is not directly visible and is positioned between the housing 5 and the roof liner 14 around the edge of the lighting device. This light guide, which is fed with light by way of a light source not shown, generates indirect ambient light by way of reflection or scattering of its emitted light radiation on the roof liner, as indicated by two arrows P3 in FIG. 4 in exemplary fashion. Optionally, an LED luminous band can also be used instead of a light guide 13. The light guide or a corresponding LED band is once again an optional component of the lighting device and may optionally also be dispensed with.

The embodiment of the invention described above has numerous advantages. In particular, a lighting device for the interior of a motor vehicle is created, which has a very aesthetic appearance in the form of a sculpturally shaped component. In this case, the sculptural shape is obtained by way of a faceted cover plate, through which the light of the lighting device enters into the interior of the motor vehicle. Thus, the impression of a diamond or a crystal arises, and is conveyed to a vehicle occupant in the cold appearance as well, that is to say when the lighting device is switched off. Moreover, a very pleasant ambient illumination with a homey atmosphere in the style of a lounge or living room is created when the lighting device is switched on (i.e., when the light sources for feeding light into the flat light guides are activated).

Further light effects and optionally a personalization of the vehicle can be realized by various plastics embodiments of the cover plate (transparent, colored, opaque). Moreover, even more light functions in the form of a reading light or a light projection can optionally be realized in the motor vehicle. Further, a user-specific or dynamic change of the light generated by the lighting device can be obtained by using light sources with variable colors, for example RGB LEDs or RGBW LEDs.

LIST OF REFERENCE SIGNS

100 Motor vehicle
GH Greenhouse
L Longitudinal direction of the motor vehicle
1 Interior luminaire
2 Panes
3 Headrests
4 Occupant seats
Housing
6 Cover plate
601 Facets
7 Outer screen
8 Flat light guide
8a Side faces
8b Input coupling portion
8c Output coupling portion
9 Inner screen
Reading lamp
11 Projection module
12 LED
13 Light guide
14 Roof liner
P, P1, P2, P3 Arrows

The invention claimed is:

1. A lighting device for an interior of a motor vehicle, the lighting device comprising:
a housing on which a light-transmissive cover plate is provided, and
an illuminant configured to produce light in an interior of the housing, the light emerging from the lighting device through the cover plate in order to illuminate the interior of the motor vehicle, wherein:
the cover plate has a faceted outer surface made of a plurality of plane facets;
the illuminant comprises one or more planar luminous elements in the interior of the housing, with a respective planar luminous element having two opposing side faces with a planar extent and an edge situated between the side faces, and
the illuminant is configured such that, during operation, light is emitted via both side faces of the respective planar luminous element and emerges from the lighting device via the cover plate.

2. The lighting device according to claim 1, wherein the illuminant is configured such that, during operation, light is at least sectionally emitted via the edge of the respective planar luminous element and emerges from the lighting device via the cover plate.

3. The lighting device according to claim 1, wherein:
the illuminant comprises a plurality of light sources and, as the one or more planar luminous elements, at least in part, one or more flat light guides, and
the one or more flat light guides are arranged such that, in a respective flat light guide, light originating from the plurality of light sources and entering into an input coupling portion of its edge is guided along the opposite side faces and is at least partially emitted via the opposite side faces in order to emerge from the lighting device via the cover plate.

4. The lighting device according to claim 3, wherein some of the light guided along the opposite side faces is also emitted via an output coupling portion of the edge in order to emerge from the lighting device via the cover plate.

5. The lighting device according to claim 3, wherein one or more light sources of the plurality of light sources radiate light directly into the input coupling portion of the one or more flat light guides, and/or one or more light sources of the plurality of light sources are arranged such that light originating from the one or more light sources is reflected and/or scattered prior to entrance into the input coupling portion of the one or more flat light guides.

6. The lighting device according to claim 1, wherein the illuminant comprises, as the one or more planar luminous elements, at least in part, one or more self-luminous OLED elements.

7. The lighting device according to claim 1, wherein the illuminant is configured such that a color of the light emission is variable for at least some of the one or more planar luminous elements.

8. The lighting device according to claim 1, wherein at least some of the one or more planar luminous elements are configured to be slab-shaped with plane side faces.

9. The lighting device according to claim 8, wherein side faces of all slab-shaped planar luminous elements run substantially parallel to one another.

10. The lighting device according to claim 8, wherein, in a plan view of the cover plate, the side faces of all slab-shaped planar luminous elements extend substantially perpendicular to a plane of the plan view.

11. The lighting device according to claim 1, wherein the cover plate is at least sectionally translucent, at least sectionally transparent, at least sectionally light-scattering, and/or at least sectionally colored.

12. The lighting device according to claim 1, wherein a projection apparatus for projecting a light distribution into the interior of the motor vehicle is installed in the housing of the lighting device.

13. The lighting device according to claim 12, wherein:
the projection apparatus comprises a DMD apparatus, a multi-aperture projection unit, and/or a roller with reflective and nonreflective portions,
the roller rotates during operation and is illuminated by a luminous unit of the projection apparatus, and
an illuminated region of the roller is projected into the interior of the motor vehicle by an optical unit of the projection apparatus.

14. The lighting device according to claim 1, wherein one or more luminaires are installed in the housing of the lighting device, and the luminaires are each provided to illuminate a delimited passenger region.

15. The lighting device according to claim 1, further comprising an additional illuminant for indirect illumination of the interior of the motor vehicle.

16. The lighting device according to claim 15, wherein the additional illuminant is a light guide and/or an LED band.

17. The lighting device according to claim 1, wherein the lighting device is configured to be installed in a trim of the interior of the motor vehicle.

18. The lighting device according to claim 17, wherein the lighting device is configured to be installed at a position above a door panel of the motor vehicle.

19. The lighting device according to claim 18, wherein the lighting device is configured to be installed in a roof liner of the motor vehicle.

20. A motor vehicle comprising the lighting device according to claim 1.

* * * * *